Nov. 30, 1971   P. G. HOLT   3,623,231
ANGLE GAUGE
Filed July 18, 1969

INVENTOR
PLINY G. HOLT

BY Beveridge & DeGrandi

ATTORNEYS

United States Patent Office 3,623,231
Patented Nov. 30, 1971

3,623,231
ANGLE GAUGE
Pliny G. Holt, 8813 Stonehaven Court,
Potomac, Md. 20854
Filed July 18, 1969, Ser. No. 842,859
Int. Cl. G01b 3/30, 5/24
U.S. Cl. 33—174                              3 Claims

ABSTRACT OF THE DISCLOSURE

An angle gauge for establishing an angle between two surfaces with great accuracy wherein two arms are pivotally connected for rotation about an axis that is parallel to flat base surfaces extending along one side of each arm. A reference pin of known radius protrudes from each arm parallel to the pivotal axis of the arms with the center line of each reference pin being located an accurately known distance from a radial extending perpendicularly from the pivotal axis along facing inner surfaces of the arms so that establishing the outer surfaces of the two pins into contact with the respective jaws of micro meter calipers set ot a separation calculated at twice the distance from the center line of the pins to the pivotal axis of the arms multiplied by the sine of one-half the angle to be established plus the radius of each of the pins will align the base surfaces of the two arms to define the desired angle between them.

---

This invention relates to angle gauges for accurately establishing an angle between two surfaces and is particularly useful in connection with setting up automatic machine tools such as milling machines and the like.

In order to set up the desired angle between components of machine tools, machinists have had to resort to large and very expensive protractors in which the degree of accuracy often leaves much to be desired. If a high degree of accuracy is required the machinists will usually utilize a conventional sine bar in conjunction with machine gauge blocks in which one end of the sine bar rests on the base surface and the requisite number of gauge blocks are interposed between the other end of the sine bar and the base surface to establish the reference surface of the sine bar at the desired angle to the base surface, the height of the gauge blocks being equal to the value of the sine of the desired angle times the reference length of the sine bar. Obviously the utilization of a sine bar with machine gauge blocks is a time consuming and awkward operation, besides requiring costly equipment. Further, the sine bar and gauge blocks arranged to establish the desired alignment are not portable.

The object of this invention is to produce a simple and economical device which will establish any desired angle with a high degree of accuracy.

A further object of this invention is to produce an adjustable device for accurately establishing any desired angle between two surfaces and will require commonly available measuring instruments, such as micrometer calipers, for adjusting the device to any desired angle.

A still further object of the invention is to provide an angle gauge which is an integral device and, once set, may be utilized in any position.

Yet still another object of this invention is to provide an angle gauge from which obtuse as well as acute angles can be established.

Yet still another further object of this invention is to provide an angle gauge from which compound angles can be established between two surfaces.

The applicant has accomplished these objectives in producing a simple and integral angle gauge having pivotally connecting arms having flat base surfaces extending from the pivotal axis of the two pins and reference pins located on each arm at an accurately known distance from the rotational axis of the arms. The separation of these reference pins determines the angle that is defined by the flat base surfaces of the arms. An important aspect of the invention involves the determination of the separation between the two reference pins on the basis of the sine of one-half the angle to be set in lieu of the sine of the angle and also a configuration for the reference pins which will permit the measurement of the separation of the reference pins to be accomplished by conventional micrometer calipers. A reference pin in the form of a semicircular cylinder projects outwardly from each arm parallel to the axis of rotation of the pins with the center of the semicircular pin surface being located an accurately known distance from the rotational axis of the arms. Since the radius of each reference pin is also accurately known, establishing the separation across the outer surfaces of the reference pins at twice the distance of the center line of the pin from the rotational axis of the arms multiplied by the sine of one-half the angle to be established plus the radius each pin will cause the flat angle defining surfaces of the arms to be inclined to each other at the desired angle. A simple clamping device locks the two arms together with the reference pins separated by the calculated distance to establish the desired angle.

The exact nature of this invention as well as other objects and advantages thereof will be readily apparent from consideration of the following specification relating to the next drawings in which.

Figure 2:
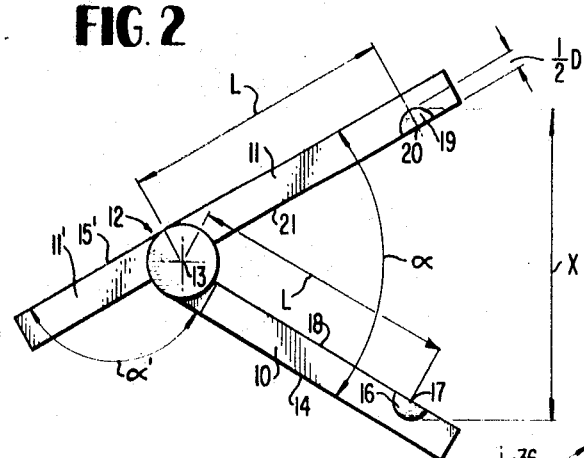
FIG. 2 is a schematic drawing illustrating the basic principle of the invention and also another embodiment by means of which obtuse angles can be established.

The basic principle on which the invention is based is best understood with reference to FIG. 2. In that figure elongated arms 10 and 11 are pivotally joined together by a clamping type of pin pivotal connection 12 (subsequently described) to rotate about an axis 13. The outwardly and oppositely facing side surfaces 14 and 15 of the respective arms 10 and 11, that are the base surfaces between which the desired angle α is defined, define planes that are parallel to the pivotal axis 13 about which the two arms are rotatable relative to each other. A cylindrical pin 16 having a semicircular cross section projects outwardly from the outer surface of the arm 10 parallel to the pivotal axis 13 of the two arms with the center line 17 of the pin 16 being located a distance L from the pivotal axis 13. The center line 17 of the pin 16 is in the plane 18 formed by the inner surface of the arm 10, which plane 18 passes through and contains the pivotal axis 13 of both pins, hence the center line 17 of the pin 16 intersects a radius extending perpendicularly from the axis of rotation 13 a distance L from the axis of rotation. A similar semicircular pin 19 is similarly located on the other arm 11 with the center line 20 of the pin located the same distance L from the pivotal axis 13 of the arms and in the plane 21 of the inner surface of the arm 11 that passes through its axis of rotation 13. The radius of each of the semicircular pins 16 and 19 is the same, ½D.

Through this arrangement of the arms 10 and 11 and the configuration of the reference pins 16 and 19, the separation X between the outer surfaces of the pins 16 and 19 is a direct function of the angle α formed by the base surfaces 14 and 15 of the two arms 10 and 11 The arrangement described of the various elements establishes the trigonometric relationship that the separation between the outer surfaces of the two pins 16 and 19, or X, required to align the base surfaces 14 and 15 to define a desired angle α is calculated by the formula:

$$X = (2L \sin \tfrac{1}{2}\alpha) + D$$

Thus to arrange the arms 10 and 11 such that their outer base surfaces 14 and 15 define the angle α between them, the value X is calculated on the basis of this formula, a micrometer caliper is set to the calculated distance X and then the arms 10 and 11 are pivoted to bring the outside surfaces of the reference pins 16 and 19 into contact with the arms of the micrometer caliper. For example if the dimension L is 1.5 inches and the radius of each of the reference pins is .125 inch (the diameter across both pins being 0.25 inch), if the desired angle α is 30° the distance X to bet on the micrometer calipers would be $(3 \times .259) + 0.25 = 1.027$ inches, the sine of 15° being 0.259.

Figure 1:
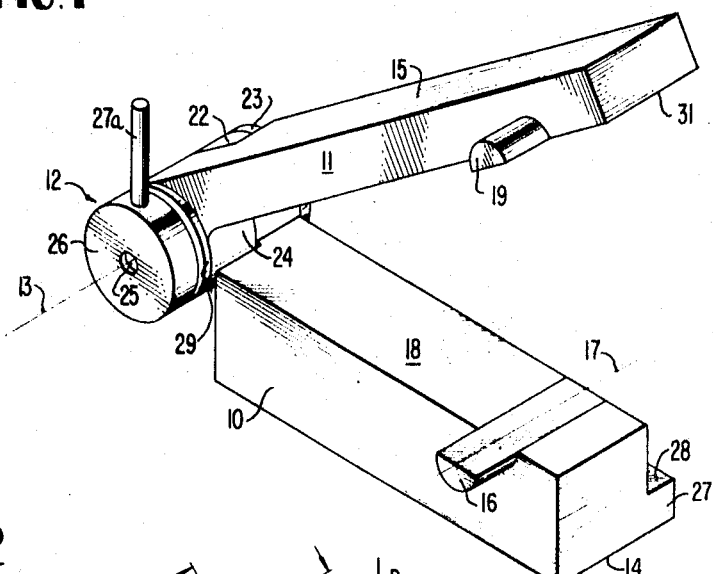
FIG. 1 is a perspective view of one embodiment of the invention.

Although the embodiment of the applicant's invention illustrated in FIG. 1 will directly establish only acute angles, the embodiment illustrated in FIG. 2, in which the arm 11 has an extension 11' extending on the other side of the pivotal axis 13 permits obtuse angles α' to be established, α' being equal to 180° minus the angle α. Therefore, if it is desired to establish an angle of 125° (α') between the base surface 14 of the arm 10 and base surface 15' of the extention 11' of the arm 11, the separation X between the pins 16 and 19 would be calculated on the basis of the sine of one-half the angle 55° (α).

FIG. 1 illustrates a specific working embodiment of the invention schematically illustrated in FIG. 2, like numbers being assigned to like parts in these figures. The arm 10 constitutes a machined bar having opposite flat surfaces 14 and 18, a collar 22 being formed on one end of the bar 10 with an inside diameter of that of a pivot pin that extends into the collar from the outer flange end 23 of the pivot pin. One end of the bar 11 is similarly machined to form a collar 24 having an inner bore fitting around the pivot pin alongside the collar 22 of the other bar. The end 25 of the pivot pin opposite the flanged end 23 and protruding beyond the collar 24 of the bar 11 is threaded to receive the threaded central bore of a locking head 26 having an annular flange (not illustrated) on its inner surface that engages a washer 29 on the outer end of the collar 24 to lock together the two collars of the bars 10 and 11 and prevent their rotation when the locking head 26 is screwed onto the pivot pin by applying pressure against the locking handle 27a. A lip 27 extends outwardly longitudinally of the lower length of the bar 10, the lower surface of the lip 27 being coincident with the lower base surface 14 of the bar 10 and having an upper surface 28 which is parallel to the lower base surface 14. Thus the lip 27 may be clamped in the jaws of a vice or held by clamps in position against a primary base aligning surface.

Figure 3:
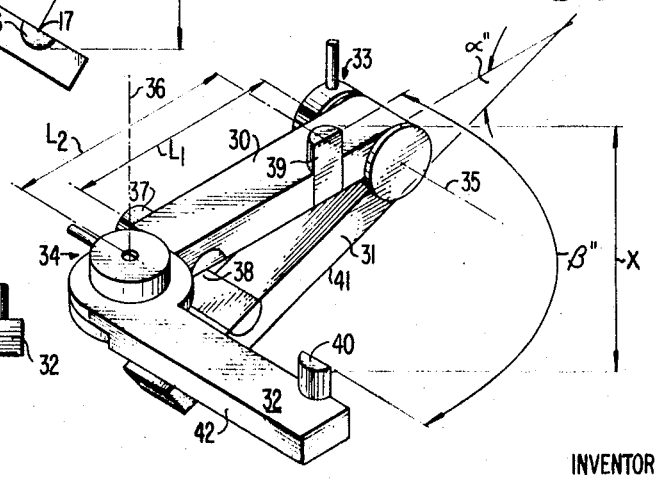
FIG. 3 is a perspective view of another embodiment of the invention for establishing compound angles.
Figure 4:
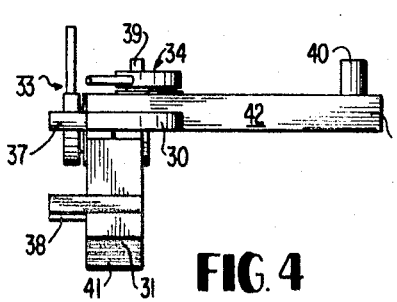
FIG. 4 is an end view of the device illustrated in FIG. 3.

An arrangement by which a compound angle may be established is illustrated in FIGS. 3 and 4, which constitutes a combination of two gauges illustrated in FIG. 1. The compound angle gauge of FIG. 3 permits the accurate establishment of a compound angle between two base surfaces in which the two components of the compound angle are the angles α'' and β'' in two mutually perpendicular planes. The compound angle gauge utilizes a common arm 30 at both ends of which secondary arms 31 and 32 are pivotally connected by threaded locking pin arrangements 33 and 34, similar to the lockable pivotal connection 12 of FIG. 1, such that the two secondary arms 31 and 32 rotate with respect to the common arm 30 about the mutually perpendicular axes of rotation 35 and 36. Semicircular reference pins 37 and 38 are located on the common arm 30 and one of the secondary arms 31, respectively, a distance $L_1$ from the axis of rotation 35 in the same manner as described for the gauge of FIG. 1. Similarly reference pins 39 and 40 are located on the base arm 30 and othe other secondary arm 32, respectively, a distance $L_2$ from the other axis of rotation 36 to protrude above the respective surfaces of the arms at 90° to the other reference pins 37 and 38. For convenience the distances $L_1$ and $L_2$ should be the same as well as the radii of the various reference pins, although this is not necessary To establish a compound angle of α'' and β'' between the two base surfaces 41 and 42 of the respective secondary arms 31 and 32, the separation required between the outside surfaces of the reference pins 37 and 38 is calculated as described above to establish the angle α'' between the base arm 30 and secondary arm 31. The separation required between the other set of reference pins 39 and 40 is calculated to establish the angle β'' between the common arm 30 and the other secondary arm 32. The calculated separation between the two sets of reference pins is set in the same manner as described above for the dual arm angle gauge through using a micrometer caliper set to the respective distances for the angles α'' and β''. After each pair of reference pins is set to the required separation through the use of micrometer caliper, the respective base aligning surfaces 41 and 42 of the respective secondary arms 30 and 32 will establish between them the compound angle defined by its respective perpendicularly aligned components α'' and β''. Although not specifically illustrated, it is apparent that a compound angle with components in all three of the mutually perpendicular planes could be established by pivotally mounting a third arm on the secondary arm 32 with an axis of rotation that would be mutually perpendicular to the two axes of rotation 35 and 36 illustrated in FIG. 3 and having reference pins protruding from these two arms parallel to this third axis of rotation a fixed distance from the rotational axis in the same manner previously discussed.

Obviously the accuracy with which angles can be established by the angle gauge relates to some degree to the length of the arms and the distance L that the reference pins are located from the axis of rotation of the pivoted arms. In a device of the nature disclosed in FIG. 1, it is estimated that angles can be established with an accuracy of about 1 minute of arc with an angle gauge in which the distance L is about 1½ inches utilizing standard micrometer calipers that can be set to a $\frac{1}{1000}$ of an inch. Thus it can be seen that highly accurate angles can be established through the use of a relatively small device. Obviously the accuracy with which the angle gauge can be set is greater if the angle α is established at less than 45° to 60° due to the convergence of the value of the sine of large angle but this offers no problem as the complement of the angle can usually be utilized for purposes of setting up base surfaces by using a square with one of the base surfaces in conjunction with the angle gauge.

The foregoing disclosure relates to only typical embodiments of the invention and it is to be understood that numerous modifications and variations, particularly utilizing equivalents, are possible without departing from the spirit and scope of the invention as set forth in the appended claims.

What is claimed is:

1. An adjustable angle gauge for accurately establishing a compound angle comprising a first and a second elongated arm pivotally connected for rotation about a first axis of rotation, said first and second arms each having a flat side surface of which the plane is parallel to said first pivotal axis and parallel to one of a pair of first radials extending perpendicularly from said first pivotal axis, one of a paair of oppositely facing first reference surfaces projecting from each of said first and second arms, said first reference surfaces each being defined by a circular cylindrical surface whose central axis passes through a point located on each of said first radials a first fixed distance from and parallel to said first pivotal axis, means for locking said first and second arms against relative rotation with the measured separation between said first reference surfaces establishing the distance between said first pair of points at twice said first fixed distance multiplied by the value of one-half the sine of the angle being defined between said side surfaces of said first and second arms.

a third elongated arm pivotally connected to said second arm for rotation about a second axis of rotation spaced from said first pivotal axis and perpendicular to said first pivotal axis, said second and third arms each having a flat side surface of which the plane is parallel to said second pivotal axis and parallel to one of the pair of second radials extending perpendicularly from said second pivotal axis, one of a pair of oppositely facing second reference surfaces projecting from each of said second and third arms, said second reference surfaces each being defined by a circular cylindrical surface whose central axis passes through a point located on each of said second radials a second fixed distance from and parallel to said second pivotal axis, and means for locking said second and third arms against relative rotation with the measured separation between said second reference surfaces establishing the distance between said second pair of points at twice said second fixed distance multiplied by the sine of one-half the angle being defined between the side surfaces of said second and third arms, thereby establishing a compound angle defined by the side surfaces of said first and third arms.

2. The angle gauge described in claim 1 wherein said reference surfaces each comprises a pin of semi-circular cross section extending from each of said arms parallel to the respective pivotal axes with which associated.

3. An adjustable angle gauge for accurately establishing a compound angle comprising a first and a second elognated arm pivotally connected for rotation about a first pivotal axis, said first and second arms each having a flat side surface of which the plane is parallel to said first pivotal axis and parallel to one of a pair of first radials extending perpendicularly from said first pivotal axis, said first and second arms having oppositely facing first reference surfaces each of which has the outline shape conforming to the arc of a circle of which the center is coincident with a line passing through a point located on each of said first radials a first fixed distance from and parallel to said first pivotal axis, means for locking said first and second arms against relative rotation with the measured separation between said first reference surfaces establishing the distance between said first pair of points at twice said first fixed distance multiplied by the value of one-half the sine of the angle being defined between said side surfaces of said first and second arms, a third elongated arm pivotally connected to said second arm for rotation about a second pivotal axis spaced from said first pivotal axis and perpendicular to said first pivotal axis, said second and third arms each having a flat side surface of which the plane is parallel to said second pivotal axis and parallel to one of the pair of second radials extending perpendicularly from said second pivotal axis, said second and third arms having oppositely facing second reference surfaces each of which has the outline shape conforming to the arc of a circle of which the center is coincident with a line passing through a point located on each of said radials a second fixed distance from and parallel to said second pivotal axis, and means for locking said second and third arms against relative rotation with the measured separation between said second reference surfaces establishing the distance between said second pair of points at twice said second fixed distance multiplied by the sine of one-half the angle being defined between the side surfaces of said second and third arms, thereby establishing a compound angle defined by the side surfaces of said first and third arms.

References Cited

UNITED STATES PATENTS

| | | | |
|---|---|---|---|
| 672,213 | 4/1901 | Holcomb | 33—174 |
| 809,191 | 1/1906 | Laduke et al. | 33—106 |
| 1,107,789 | 8/1914 | Hollandt et al. | 33—174 X |
| 2,348,712 | 5/1944 | Dahlerup | 33—179.52 |
| 2,369,477 | 2/1945 | Martin | 33—179.52 |
| 2,495,558 | 1/1950 | Walton | 33—174 |
| 2,551,169 | 5/1951 | Sachtleber | 33—174 |
| 2,812,586 | 11/1957 | Matthews | 33—174 |

FOREIGN PATENTS

| | | | |
|---|---|---|---|
| 916,241 | 1/1963 | Great Britain | 33—174 |

LEONARD FORMAN, Primary Examiner

P. G. FOLDES, Assistant Examiner